(12) United States Patent
Markwardt

(10) Patent No.: US 9,339,916 B2
(45) Date of Patent: May 17, 2016

(54) PROPSHAFT HOLDING TOOL

(71) Applicant: GM GLOBAL TECHNOLOGY OPERATIONS LLC, Detroit, MI (US)

(72) Inventor: Timothy J. Markwardt, Almont, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 414 days.

(21) Appl. No.: 13/953,916

(22) Filed: Jul. 30, 2013

(65) Prior Publication Data

US 2015/0033543 A1 Feb. 5, 2015

(51) Int. Cl.
| | | |
|---|---|---|
| *B23P 11/00* | (2006.01) | |
| *B25B 5/14* | (2006.01) | |
| *F16C 3/02* | (2006.01) | |
| *B25B 5/10* | (2006.01) | |
| *B25B 23/00* | (2006.01) | |
| *B25B 27/00* | (2006.01) | |

(52) U.S. Cl.
CPC ... *B25B 5/14* (2013.01); *B25B 5/10* (2013.01); *B25B 5/103* (2013.01); *B25B 5/147* (2013.01); *B25B 23/0085* (2013.01); *B25B 27/0035* (2013.01); *F16C 3/02* (2013.01); *F16C 2322/50* (2013.01); *Y10T 29/49998* (2015.01)

(58) Field of Classification Search
CPC ...... B25B 5/14; B25B 5/147; B25B 27/0035; B25B 23/0085; B25B 5/103; B25B 5/10; B25B 9/00; F16C 3/02; F16C 2322/50; Y10T 29/49998; Y10T 29/49662; Y10T 29/49947; Y10T 29/49948; Y10T 403/53; Y10T 403/535
See application file for complete search history.

(56) References Cited

U.S. PATENT DOCUMENTS

| | | | | |
|---|---|---|---|---|
| 391,177 | A * | 10/1888 | Metcalfe | B30B 1/18 100/289 |
| 3,986,242 | A * | 10/1976 | Kerr | B25B 27/023 29/261 |
| 4,850,800 | A * | 7/1989 | Zygutis | B63H 20/36 416/146 R |
| 4,882,960 | A * | 11/1989 | Kugler | A01D 34/001 269/319 |
| 4,956,905 | A * | 9/1990 | Davidson | A01D 34/001 29/213.1 |
| 6,272,724 | B1 * | 8/2001 | Sterling | A01D 34/001 29/281.1 |
| 6,276,039 | B1 * | 8/2001 | Barnes | A01D 34/828 29/402.03 |
| 6,343,529 | B1 * | 2/2002 | Pool | B25B 9/00 81/13 |
| 6,715,194 | B1 * | 4/2004 | Sterling | A01D 34/001 29/281.1 |

(Continued)

FOREIGN PATENT DOCUMENTS

| | | |
|---|---|---|
| CN | 101100052 A | 1/2008 |
| CN | 202964568 U | 6/2013 |

*Primary Examiner* — David Bryant
*Assistant Examiner* — Steven A Maynard

(57) ABSTRACT

A holding tool for releasably securing a shaft from rotation relative to the holding tool. The holding tool may have a head including a pair of semi-cylindrical main bodies, each head having a hinge flange extending from a respective first end of the main body and a bolt flange extending from a respective, opposed second end of the main body, with each bolt flange including a fastener hole; a hinge pivotally securing the hinge flanges together; a fastener received through the fastener hole and selectively biasing the bolt flanges toward one another; a pair of semi-cylindrical shaped resilient inserts, each secured to an inner surface of the main bodies, defining a cylindrical channel to receive the shaft; and a handle extending generally radially outward from the head. The holding tool may be used to secure a propshaft to a vehicle.

8 Claims, 4 Drawing Sheets

(56) References Cited

U.S. PATENT DOCUMENTS 7,421,771 B2 * 9/2008 Heathman ............... B25B 13/02 29/426.5

8,302,274 B1 * 11/2012 Depaz .................. A01D 34/001 269/229

2001/0035080 A1 * 11/2001 Adams ...................... B25B 9/00 81/488

* cited by examiner

PROPSHAFT HOLDING TOOL

BACKGROUND OF INVENTION

The present invention relates generally to a removable tool for preventing a shaft from rotating, and more particularly a tool for holding a propshaft from rotating during vehicle assembly or repair.

While assembling automotive vehicles, and in particular, four wheel drive trucks, some difficulties may be encountered in assembling a front propshaft to the vehicle drivetrain. The propshaft is assembled to the front axle and transfer case. Particularly in situations where a propshaft is being repaired or replaced, or when the front propshaft is installed off of a vehicle assembly line, a means for holding the propshaft while installing six mounting bolts per flange is needed. In particular situations, the flanges securing the propshaft to the front axle and to the transfer case may be flush flanges to the front propshaft. Such a configuration may have relatively high torque requirements for the mounting bolts in order to achieve the desired clamp loads for securing the front propshaft in place. In such a situation, the front propshaft needs to be secured from rotation while applying torque to the mounting bolts. If not properly secured against rotation during installation of the mounting bolts, the proper torque of the mounting bolts may not be achieved, and moreover, the assembly may slip, pinching the installer's hand as the flange slips.

One attempt to achieve the desired assembly of the front propshaft included locking out the all wheel drive and securing the mounting bolts. But in this assembly process, the truck is on a hoist where only some of the mounting bolts are accessible. So after applying proper torque to a portion of the mounting bolts, the assembler has to lower the truck, take the axle out of all wheel drive, rotate the wheel, then lock out all wheel drive again, again raise the vehicle on the hoist, and tighten the rest of the mounting bolts with the proper torque. However, this is a very time consuming process, which is undesirable for assembling a vehicle. Moreover, circumventing portions of this process may provide false torque readings on the fasteners.

In order to improve the timeliness of the assembly process and minimize the steps, some assemblers employed tools, such as vice-grips, to grab hold of the propshaft during installation and torquing of the mounting bolts. However, this can cause dents and nicks in the surface of the propshaft, which may allow for rust on the propshaft at these locations. This may also lead to false torque readings during installation, or even to allowing for flange turning during installation, both undesirable situations.

SUMMARY OF INVENTION

An embodiment contemplates holding tool for releasably securing a shaft from rotation relative to the holding tool. The holding tool may comprise: a head including a pair of semi-cylindrical main bodies, each head having a hinge flange extending from a respective first end of the main body and a bolt flange extending from a respective, opposed second end of the main body, each bolt flange including a fastener hole; a hinge pivotally securing the hinge flanges together; a fastener received through the fastener hole and configured to selectively bias the bolt flanges toward one another; a pair of semi-cylindrical shaped resilient inserts, each secured to an inner surface of the main bodies, defining a cylindrical channel configured to receive the shaft; and a handle extending generally radially outward from the head.

An embodiment contemplates a method of mounting a propshaft to a vehicle, the method comprising the steps of: locating a pair of opposed semi-cylindrical main bodies of a head of a holding tool around the propshaft, with a pair of resilient inserts mounted to the main bodies in contact with a surface of the propshaft; clamping a pair of bolt flanges, extending from the main bodies, together, while pivoting a pair of opposed hinge flanges, extending from opposed sides of the main bodies from the bolt flanges, toward each other, compressing the resilient inserts against the surface of the propshaft to prevent rotation between the head and the propshaft; locating a handle, extending generally radially from the head, against a portion of the vehicle to prevent rotation of the propshaft holding tool in one direction; aligning a flange of the propshaft in an installed position relative to the vehicle; and securing mounting fasteners in the flange to thereby secure the propshaft to the vehicle.

An advantage of an embodiment is that a propshaft holding tool secures the propshaft in place while installing and applying torque to mounting bolts, even when a relatively high torque is required. This propshaft holding tool secures the propshaft during assembly while not nicking, denting or scuffing the propshaft or damaging any vehicle components, such as a vehicle frame or transmission. Moreover, the propshaft holding tool assures proper torque is achieved on the bolts during installation. It also minimizes the chances of the flanges moving during installation, thus assuring a proper installation and avoiding the assembler having his hand pinched during assembly. The propshaft holding tool also allows for use on different models of vehicle that may have somewhat different diameter propshafts.

DETAILED DESCRIPTION

Figure 1:
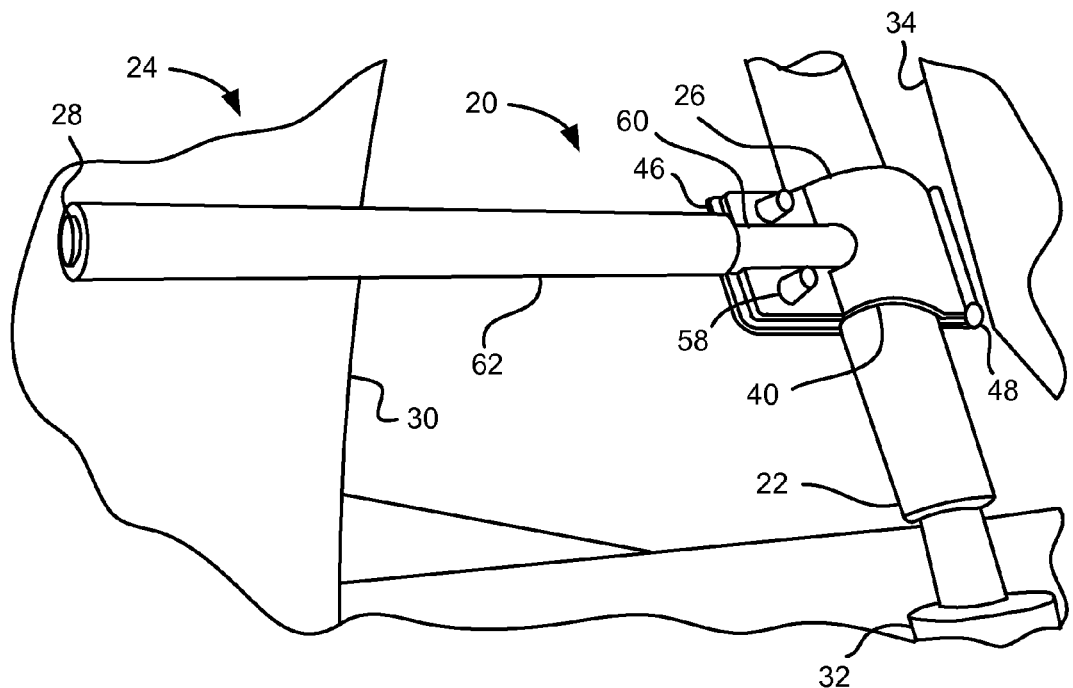
FIG. 1 is a schematic, perspective view of a propshaft holding tool mounted to a propshaft and engaging a portion of a vehicle frame.

Referring to FIG. 1, a propshaft holding tool 20 is secured to a front propshaft 22 of a vehicle, referred to generally at 24. The propshaft holding tool 20 has a head 26 that is secured to the propshaft 22. A handle (arm) 28 extends from the head 26 and engages a portion of a vehicle frame 30. A portion of one of the two flanges 32 (mounting bolts not shown) at one end of the propshaft 22 and a portion of a transmission 34 is also shown.

Figure 2:
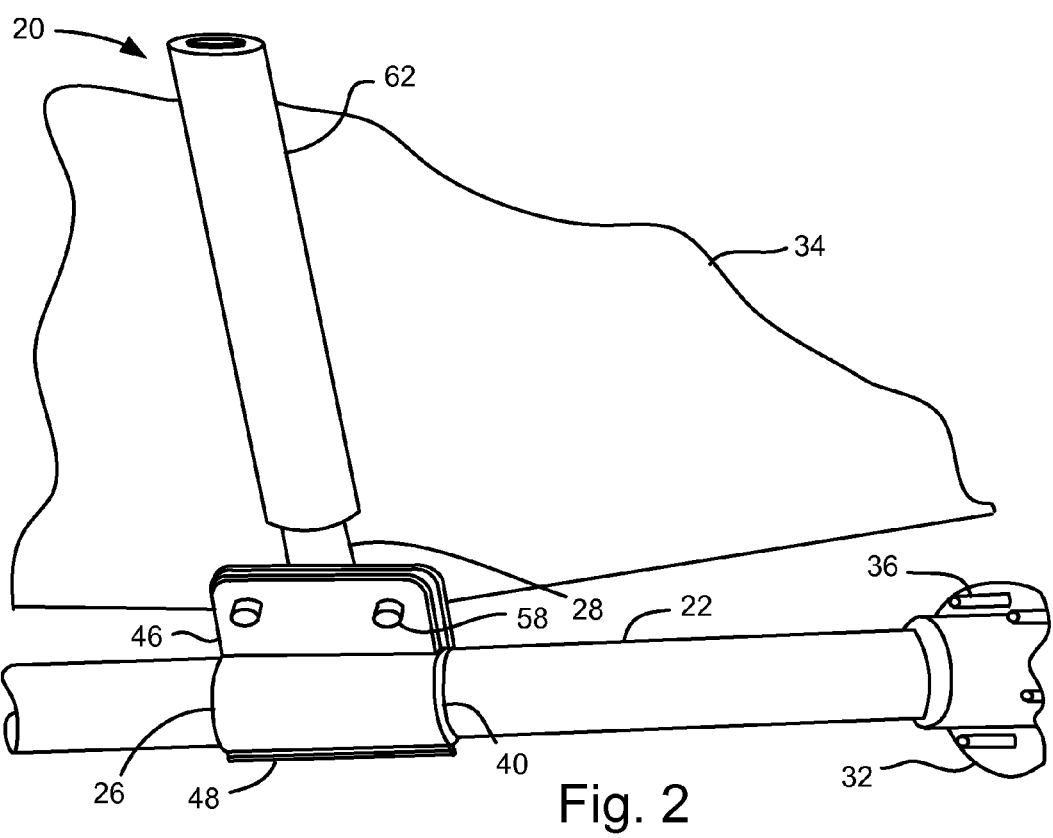
FIG. 2 is a schematic, perspective view of the propshaft holding tool mounted to the propshaft and engaging a portion of a transmission.
Figure 3:
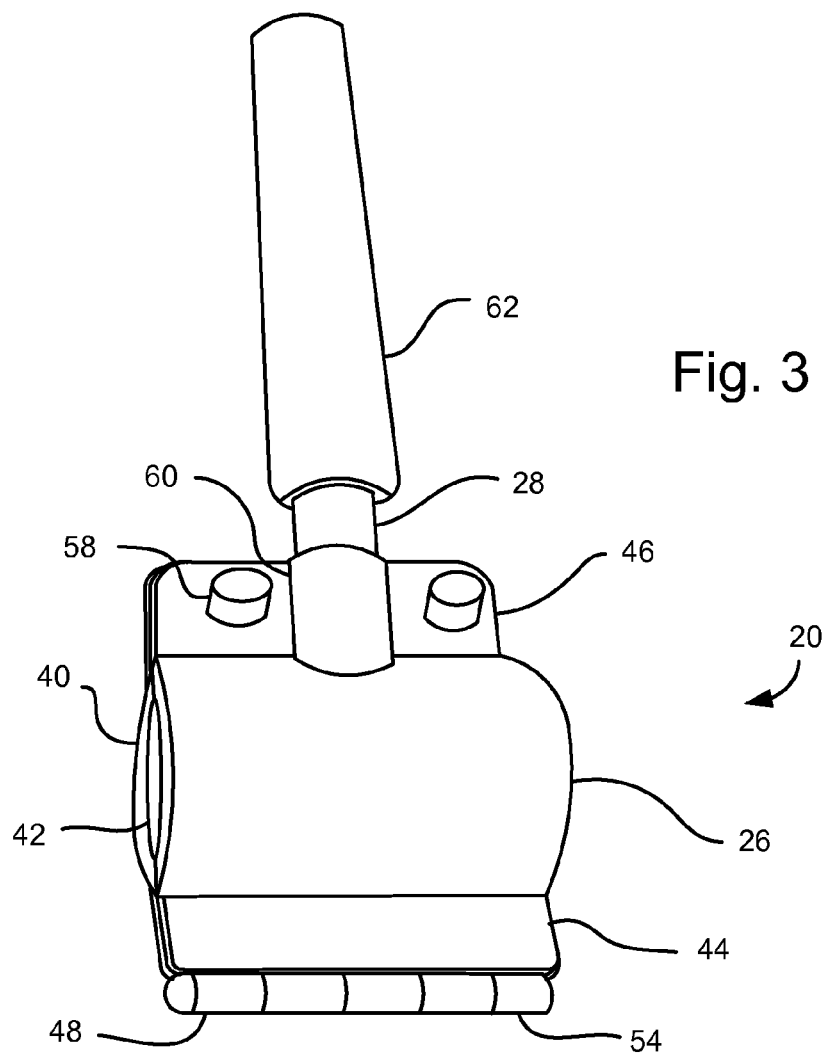
FIG. 3 is a schematic, perspective view of the propshaft holding tool.

FIG. 2 shows the head 26 of the propshaft holding tool 20 secure to the propshaft 22, with the handle 28 engaging the transmission 34. A portion of one of the two flanges 32 is also shown, with mounting fasteners (bolts) 36 extending from the flange 32.

The propshaft holding tool 20 will be discussed in more detail, with reference to FIGS. 1-5. The head 26 includes a pair of semi-cylindrical main bodies 40 that face each other to form a channel 42. Each main body 40 includes a hinge flange 44 extending generally perpendicular from a first end of its respective main body 40 and a bolt flange 46 extending generally perpendicular from an opposed second end of its respective main body 40.

A hinge 48 includes a first plate 50 secured (for example with welding or adhesive) to one of the hinge flanges 44 and a second plate 52 secured to the other of the hinge flanges 44. A hinge joint 54 pivotally secures the first and second plates 50, 52 together. The hinge 48, then, allows the main bodies 40 to pivot away from and towards each other.

Each bolt flange 46 includes a pair of fastener holes 56 aligned to allow for a pair of fasteners 58 (for example, a nut and bolt assembly) to extend through and squeeze the two bolt flanges 46 toward each other. The fasteners may be, for example, conventional types of bolts and nuts that are tightened with a wrench, or may be, for example, quick release fasteners that are relatively easy to manipulate with a hand. Other types of releasable fasteners may be used instead, if so desired.

One of the bolt flanges 46 and main bodies 40 has a handle mounting neck 60 secured to them. The neck 60 has a cavity that telescopically receives a first end of the handle 28.

The handle 28 extends outward away from the neck 60 sufficiently to be able to engage portions of the vehicle 24 during installation/removal of the propshaft 22. The handle 28 is sized and made of a material sufficient to resist torque applied to it during the propshaft installation/removal process. Also, a cover 62 may be mounted around the handle 28. The cover 62 is preferably made of a softer material that will allow the handle 28 to press against portions of the vehicle 24 without scratching or denting.

Figure 4:
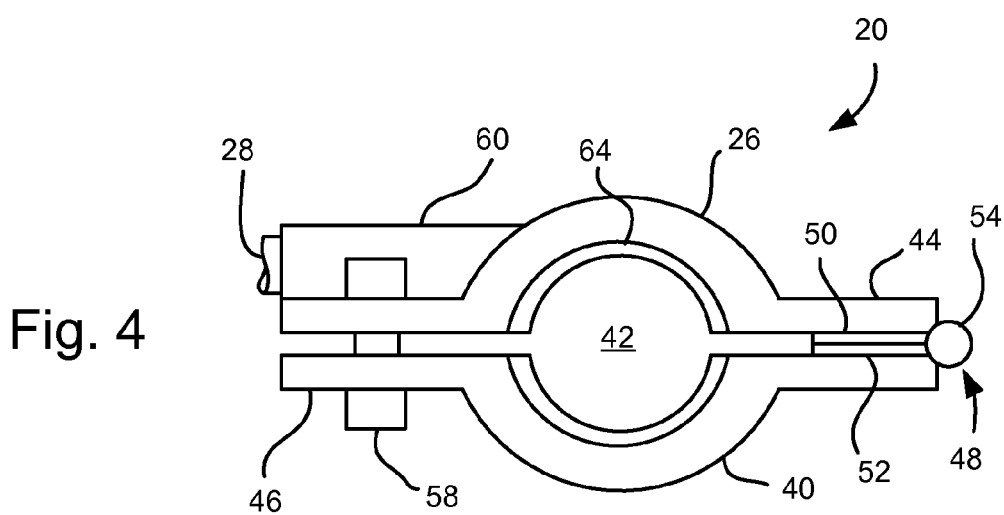
FIG. 4 is a schematic, side view of a portion of the propshaft holding tool.
Figure 5:
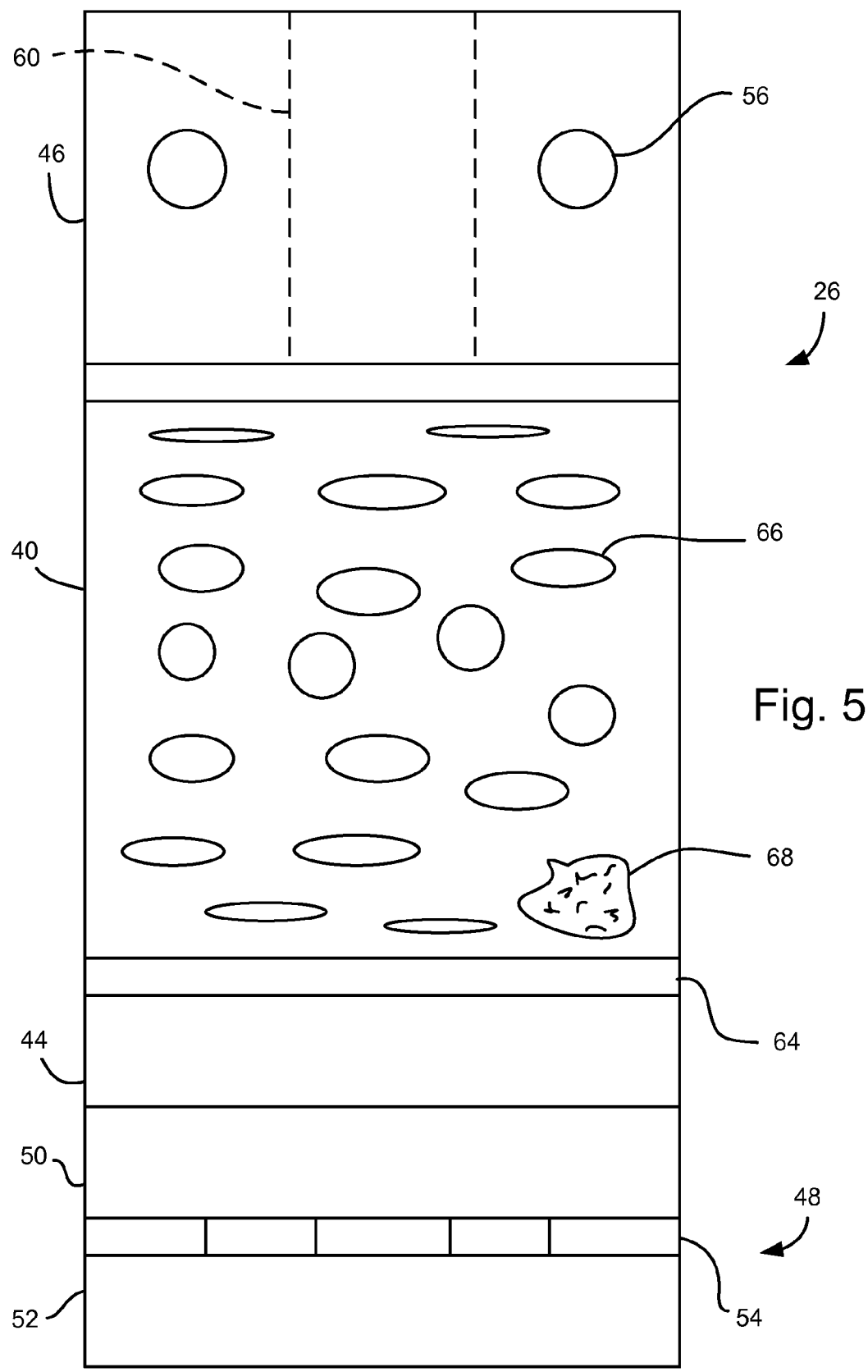
FIG. 5 is a schematic view of a portion of one half of a head of the propshaft holding tool.

Each of the main bodies 40 has a resilient insert 64 mounted to its cylindrical concave surface (see FIGS. 4 and 5). The insert 64 may be made of neoprene rubber or other elastomeric material that will allow the holding tool 20 to press firmly against the propshaft 22 without nicking or gouging the propshaft 22. Each of the inserts 64 may include holes 66. The holes 66 may help when the insert 64 is being pressed against the propshaft 22 to better prevent the propshaft 22 from slipping relative to the inserts 64 during propshaft installation/removal. This may possibly be due to a suction cup effect between the holes 66 and the surface of the propshaft 22.

Additionally, a sticky coating 68 (only a small portion of it shown in FIG. 5) may be applied to the surfaces of the inserts 64 in order to further increase the friction between the holding tool 20 and the propshaft 22. Such material may be, for example, material applied to the grips of golf clubs to improve the friction between a golfer's hand and a golf club handle.

One use of the propshaft holding tool 20 will now be discussed. The fasteners 58 are loosened or removed, allowing the bolt flanges 46 to separate and the hinge 48 to pivot the heads 26 apart to allow for insertion of the propshaft 22 into the channel 42. The main bodies 40 are mounted around the propshaft 22 so that the inserts 64 are in contact with the surface of the propshaft 22. At this point in the process, the fasteners 58 may be tightened, which pulls the bolt flanges 46 toward each other, causing the inserts 64 to be compressed against the outer surface of the propshaft 22. For installation, the propshaft 22 is aligned so that the mounting bolts 36 can slide through holes in the flanges 32 to secure the propshaft 22 in place. The mounting may be, for example, securing the propshaft 22 between a transfer case and vehicle front axle (not shown). The bolts 36 are secured to the proper torque. During this torquing of the bolts 36, the inserts 64 in the main bodies 40 prevent relative rotation between the holding tool 20 and the propshaft 22, while the handle 28 may press against the transmission 34 or vehicle frame 30 to resist the torque being applied.

This process may include using a first orientation to tighten the first three or four mounting bolts 36 on a particular end of the propshaft 22 and then rotating to allow for the tightening of the remaining two or three mounting bolts 36 (assuming a six bolt pattern on each end of the propshaft 22).

After installation is complete, the fasteners 58 are removed, the heads 26 are pivoted apart about the hinge 48, and the holding tool 20 is removed from the propshaft 22. Thus, the propshaft 22 is held in the proper position during torquing of the mounting bolts 36 without damaging the outer surface of the propshaft 22 or the components against which the handle 28 reacts.

Alternatively, if so desired, during installation, the fasteners 58 may be tightened after aligning the propshaft 22 relative to the vehicle components in order to initially orient the holding tool 20 to nest against the component it will react against during mounting bolt torquing process.

The holding tool 20 may also be used for removal of the mounting bolts 36 in order to remove the propshaft 22 from the vehicle. The mounting and dismounting of the holding tool 20 from the propshaft 22 for this procedure is similar to that for installation and so will not be discussed further herein.

In addition, the holding tool 20 can accommodate somewhat different diameters of propshafts 22 while still properly retaining the propshaft. Thus, the holding tool 20 may be employed with different models of vehicles, which may have somewhat different diameters of propshafts 22.

Figure 6:
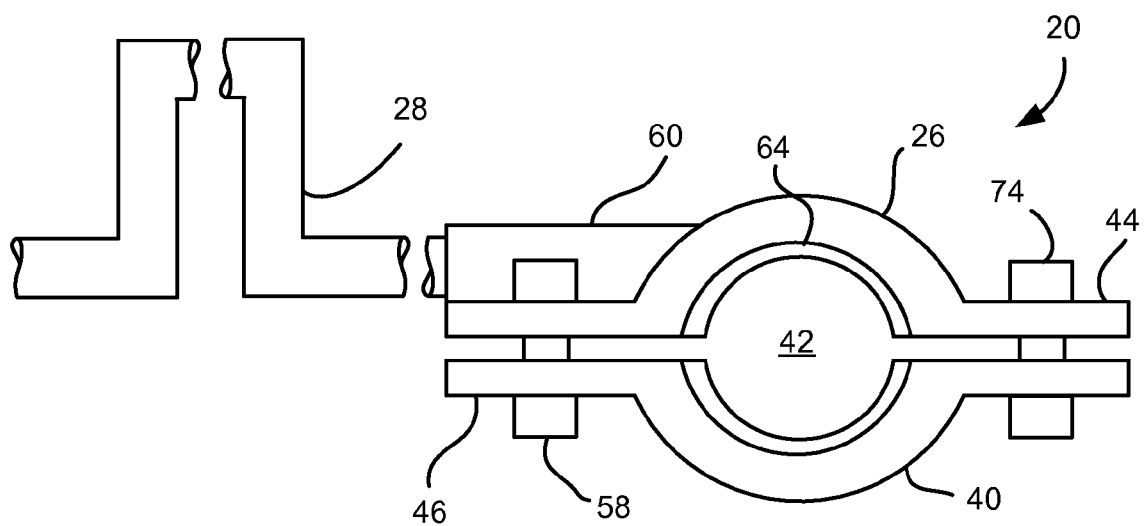
FIG. 6 is a schematic view similar to FIG. 4, illustrating some optional features of the holding tool.

FIG. 6 illustrates some optional features of the holding tool 20. Since this figure is similar to FIG. 4, some element numbers shown in FIG. 6 will not be discussed separately relative to FIG. 6 (they are already discussed above relative to FIG. 4). Optional hinge side fasteners 74 through the hinge flanges 44 may be employed instead of the hinge, if so desired. While not quite as convenient as a hinge connection when mounting the holding tool 20 to a particular propshaft, this may allow for somewhat greater differences in diameters of various propshafts that the tool can accommodate. Also, an optional bent or curved handle 28 may be employed, if so desired. For such a configuration, when one wishes to change the handle 28, the first handle is slid out of the handle mounting neck 60 and the second handle is slid in. While providing greater flexibility to work around vehicle components when aligning and mounting the particular propshafts, this configuration requires providing and keeping track of extra handles 28.

While certain embodiments of the present invention have been described in detail, those familiar with the art to which this invention relates will recognize various alternative designs and embodiments for practicing the invention as defined by the following claims.

What is claimed is:

1. A method of mounting a propshaft to a vehicle, the method comprising the steps of:
   (a) locating a pair of opposed semi-cylindrical main bodies of a head of a holding tool around the propshaft, with a pair of resilient inserts mounted to the main bodies in contact with a surface of the propshaft;
   (b) clamping a pair of bolt flanges, extending from the main bodies, together, while pivoting a pair of opposed hinge flanges, extending from opposed sides of the main bodies from the bolt flanges, toward each other, compressing the resilient inserts against the surface of the propshaft to prevent rotation between the head and the propshaft;

(c) locating a handle, extending generally radially from the head, against a portion of the vehicle to prevent rotation of the propshaft holding tool in one direction;
(d) aligning a flange of the propshaft in an installed position relative to the vehicle; and
(e) securing mounting fasteners in the flange to thereby secure the propshaft to the vehicle.

2. The method of claim 1 wherein step (b) is further defined by the resilient inserts being made of neoprene rubber.

3. The method of claim 2 wherein step (b) is further defined by each of the resilient inserts including a plurality of holes therethrough.

4. The method of claim 3 wherein step (b) is further defined by each of the resilient inserts including a tacky coating on a surface in contact with the propshaft.

5. The method of claim 1 wherein step (c) is further defined by the handle being a cylindrical bar and including an elastomeric cover extending around an outer surface of the handle in contact with the portion of the vehicle.

6. The method of claim 1 wherein step (b) is further defined by each of the resilient inserts including a plurality of holes therethrough.

7. The method of claim 1 wherein step (b) is further defined by each of the resilient inserts including a tacky coating on a surface in contact with the propshaft.

8. The method of claim 1 wherein step (c) is further defined by the portion of the vehicle being a transmission.

\* \* \* \* \*